(12) United States Patent
Dardari (10) Patent No.: US 8,952,789 B2
(45) Date of Patent: Feb. 10, 2015

(54) METHOD AND APPARATUS FOR COMMUNICATION IN ULTRA-WIDE BANDWIDTH RFID SYSTEMS

(75) Inventor: Davide Dardari, Savignano sul Rubicone (IT)

(73) Assignee: Alma Mater Studiorum—Universita' di Bologna (IT)

( * ) Notice: Subject to any disclaimer, the term of this patent is extended or adjusted under 35 U.S.C. 154(b) by 919 days.

(21) Appl. No.: 12/920,031

(22) PCT Filed: Feb. 25, 2009

(86) PCT No.: PCT/IB2009/000360
§ 371 (c)(1),
(2), (4) Date: Nov. 16, 2010

(87) PCT Pub. No.: WO2009/106964
PCT Pub. Date: Sep. 3, 2009

(65) Prior Publication Data
US 2011/0050399 A1    Mar. 3, 2011

(30) Foreign Application Priority Data

Feb. 29, 2008   (IT) ................. MO08A0053

(51) Int. Cl.
*H04Q 5/22* (2006.01)
*G08B 13/14* (2006.01)
(Continued)

(52) U.S. Cl.
CPC ............ *G06K 7/10306* (2013.01); *G01S 13/02* (2013.01); *G01S 13/756* (2013.01); *G06K 7/0008* (2013.01); *G06K 19/0723* (2013.01); *H04B 1/719* (2013.01)

USPC ....... 340/10.3; 340/10.4; 340/572.4; 375/295

(58) Field of Classification Search
USPC ....................................... 340/10.4
See application file for complete search history.

(56) References Cited

U.S. PATENT DOCUMENTS 5,701,121 A * 12/1997 Murdoch ............... 340/10.34
5,801,372 A * 9/1998 Yamaguchi .............. 235/492
(Continued)

OTHER PUBLICATIONS

Penttilä, K et al, "Radar Cross-Section Analysis for Passive RFID Systems," IEE Proceedings: Microwaves, Antennas and Propagation, Feb. 6, 2006, pp. 103-109, vol. 153 No. 1, IEE, Herts, Great Britain.

*Primary Examiner* — Jennifer Mehmood
*Assistant Examiner* — John Mortell
(74) *Attorney, Agent, or Firm* — Laubscher & Laubscher, P.C.

(57) ABSTRACT

A method for communication in ultra-wide bandwidth RFID systems comprising generating through a transceiver device an interrogated signal, composed of at least a sequence of equally time spaced pulses with period (T3), transmitting said signal to at least one RFID identification device which generates a response signal and transmits it back to said transceiver device, said method further comprising coding said interrogation signal according to a numerical coding sequence, generating said response signal by varying, in each period (T3) of said pulse sequence of the interrogation signal, the polarity of pulses using said numerical coding sequence. An apparatus for communication in ultra-wide bandwidth RFID systems comprising a transceiver device (1,101) and a RFID identification device (11), suitable for communicating each other, said RFID identification device (11) comprises a backscatter modulator (12) suitable for modulating a signal reflected by an antenna (18) of the identification device RFID.

22 Claims, 5 Drawing Sheets (51) Int. Cl.
*H04L 27/00* (2006.01)
*G06K 7/10* (2006.01)
*G01S 13/02* (2006.01)
*G01S 13/75* (2006.01)
*G06K 7/00* (2006.01)
*G06K 19/07* (2006.01)
*H04B 1/719* (2011.01)

(56) References Cited

U.S. PATENT DOCUMENTS

| | | | |
|---|---|---|---|
| 6,492,904 B2 * | 12/2002 | Richards | 340/539.1 |
| 7,346,120 B2 * | 3/2008 | McCorkle | 375/295 |
| 2005/0128131 A1 | 6/2005 | Rosenberg et al. | |
| 2006/0145853 A1 | 7/2006 | Richards et al. | |

* cited by examiner

| Tag status | Switches configuration | | | | Reflected signal |
|---|---|---|---|---|---|
| X | S1 | S2 | S3 | S4 | |
| 0 | 0 | 0 | x | 0 | |
| 1 | 1 | x | x | 0 | |
| 2 | 0 | 1 | 0 | 0 | |
| 3 | 0 | 1 | 1 | 0 | |
| 4 | 0 | 0 | x | 1 | |

METHOD AND APPARATUS FOR COMMUNICATION IN ULTRA-WIDE BANDWIDTH RFID SYSTEMS

This application is a national phase of PCT International Application No. PCT/IB2009/000360 filed Feb. 25, 2009. PCT/IB2009/000360 claims priority to IT Application No. MO2008A000053 filed Feb. 29, 2008. The entire contents of these applications are incorporated herein by reference.

The present invention relates to a method and apparatus for communication in ultra-wide bandwidth RFID systems, in particular in those systems adopting passive or semi-passive RFID identification devices.

The method and apparatus according to this invention are utilizable on radiofrequency identification systems (Radio Frequency IDentification RFID) adopting passive or semi-passive RFID devices with electromagnetic coupling.

A RFID system consists of a transmitter-receiver device, called reader, and one or more identification devices, called tags, each of them is associated with an object, that to be identified or localized. The reader generates an interrogation signal which is received by tags. As response to the received interrogation signal, tags send to the reader a response signal containing specific information, such as, the identifier of the object with which the tag is associated.

Tags can be classified in three typologies depending on the type of power supply they are equipped with:
- active tags: contain their own power source that supplies the whole device which consist of a complete radio transceiver;
- passive tags: do not have their on power source, they derive the energy from the signal sent by the reader or, in general, from the surrounding environment;
- semi-passive tags: contain their own power source providing energy only for the information processing circuits, but it is not able to supply a transceiver radio device.

Passive and semi-passive tags are not equipped with a transceiver and tag-reader information transmission is in general based on an antenna modulator which controls the antenna's load impedance. In this way passive and semi-passive tags, to transmit their information, exploit the absorption or the reflection of the signal coming from the reader (usually a sinusoidal tone, hence a narrowband signal). In particular, the electromagnetic wave, incident to the tag's antenna, gives part of its energy to the antenna's load, while the remaining energy is reflected as backscattering. To transfer the information contained in its own memory, the tag modulates, through the control of the antenna's impedance (backscatter modulation), the reflected power (backscatter).

Passive tags are usually preferred in radiofrequency identification systems due to their better adaptability to requested applications, low cost, long lifetime, small size. The commercialized devices are mostly based on magnetic coupling (band at 13 MHz). Recently passive devices based on narrow bandwidth electromagnetic coupling working in the 865 MHz and 2.4 GHz bands with operation range of about 3-4 meters have been introduced.

However, current RFID systems have several limitations. First of all, current RFID tags based on narrow bandwidth backscatter modulation are extremely limited in read/write operating range, typically less than 3-4 m. To achieve this operating range transmission power levels in the order of 2-4 W are required which preclude their use in specific environments such as in medical applications. The maximum number of tags contemporaneously addressable by the reader is strongly limited by the low transmission data rate and by the high probability of interference among tags present in the same area. One severe problem is represented by the reception of several echoes of the transmitted signal (multipath) due to signal reflections in the surrounding environment. Where the various signal echoes adding each other in destructive way thus creating shadowed zones within the coverage area and hence a less reliable system. Considering that signals are narrow bandwidth, the temporal resolution, and hence the spatial resolution is insufficient to achieve accurate localization of tags at centimeter precision. That precludes the utilization of RFID tags in many applications where the localization capability is fundamental (for example, objects tracking).

Moreover, information transmission security problems are present. In fact, considering that these devices are passive, they cannot host ciphering devices, which would require a larger availability of energy: therefore data are easily detectable. Finally, current systems are not protected against the presence of interference (for example, caused by other RFID systems working in the same area or by intentional interferers).

Recently, RFID systems adopting the impulse-radio Ultra Wide Band (UWB) technology have been proposed, wherein the signal transmission occurs at a very low duty cycle, i.e. using pulses with duration less that one nanosecond.

UWB signals have a fractional bandwidth greater than 200 or an absolute bandwidth larger than 500 MHz: this offers several advantages both for communication and localization applications. The ultra-wide bandwidth improves the reliability. In fact, as the signal contains a large number of spectral components, the probability that at least some of them can go through obstacles is increased. It offers extraordinary robustness to interference produced by other systems and an extraordinary precision in distance estimation based on time-of-arrival measurement of the received signal.

The possibility to resolve, various signal components reflected by the surrounding environment allows not only for reducing the shadowed zones within the coverage area but it can be exploited advantageously by collecting the energy coming from different components using Rake receivers thus increasing the coverage area.

Summarizing, the UWB technology is a good candidate to overcome the limitations of the actual narrow bandwidth RFID technology thanks to lower transmission power levels (<1 mW vs 2-4 W required by actual RFID systems), extremely accurate localization (at centimeter level) even in indoor environments, robustness to interference and multipath propagation (better area coverage and reliability), possibility of large number of devices co-existing in the same area (multiple access).

UWB was recently proposed to realize radiofrequency tags (UWB-RFID), that is low cost and low energy consumption devices. So far, proposed tags are active and include a complete UWB transceiver powered by a battery.

U.S. Pat. No. 3,154,396 describes a passive or semi-passive UWB-RFID system based on backscatter modulation, wherein a reader transmits a sequence of equal very short pulses which are reflected or not by the tag through the variation of the antenna loading conditions (matched load vs open circuit) according the information bit to be transmitted. However, no sufficient details are provided on the signal modulation and demodulation process.

Recent measurements on UWB antenna backscatter properties have shown that the signal reflected by the tag is composed of a backscatter component (named structural mode), dependent on the antenna physical structure whose intensity does not depend on antenna load and hence on the tag's information data, which, results to be completely overlapped and dominant with respect to the backscatter component dependent on the antenna load (named antenna mode). This phenomena makes the solution proposed in U.S. Pat. No. 7,154,396 not utilizable because the antenna reflects for each load condition, thus making extremely difficult, even impossible, to recognize the reflected, pulses that are the code of the signal transmitted by the tag. This situation gets worse if, in addition to the signal reflected by the tag's antenna, other signal components reflected by the surrounding environment (clutter) or by other tags are present. Moreover, considering that the international spectrum regulatory constraints do not allow the emission of UWB signals with transmitted power level larger than about −2 dBm, associating one bit for each reflected pulse, as proposed in U.S. Pat. No. 7,154,396, does not guarantee a sufficient level of energy received by the reader for a reliable information detection at significant operating ranges.

One aspect of the present invention is directed to provide a method for the communication in ultra-wide bandwidth RFID devices able to overcome the above mentioned limitations.

Another aspect of the present invention is directed to provide an apparatus able to implement such a method.

According to the invention, a method for the communication in ultra-wide bandwidth RFID systems is provided wherein a transceiver device generates an interrogation ultra-wide bandwidth signal, the signal including at least a sequence of equally time spaced pulses within a period ($T_s$), transmitting the signal to at least one RFID identification device, processing the interrogation signal according to the information stored in the RFID device and transmitting it back to the transceiver device as a response signal, receiving the response signal through the transceiver device and further processing the response signal to detect the information included in the response signal. The method further includes:

coding the interrogation signal according to a numerical coding sequence that determines the polarity of each pulse of the sequence of pulses;

generating the response signal in the RFID device by varying, in each period ($T_s$) of the sequence of pulses of the interrogation signal, the polarity of the pulses using the numerical coding sequence through the variation of the antenna load (backscatter modulation), so that all the pulses reflected by the tag in the same period ($T_s$) have the same polarity.

Owing to the invention it is possible to make the communication between the tag and the reader robust with respect to signal reflections in the surrounding environment and to eliminate the effect of the tag's antenna structural dependent component in the response signal.

Another aspect of this invention is directed to an apparatus for the communication in ultra-wide bandwidth RFID devices including a transceiver device and a RFID identification device configured to communicate with each other. The RFID device includes a backscatter modulator configured to modulate a signal reflected by the RFID identification device's antenna. The backscatter modulator includes a first switch S1 placed in parallel to the antenna and a second switch parallel to the antenna and in series to a load impedance.

The invention will be disclosed below, purely by way of non-limiting example, with reference to the attached drawings, in which.

Figure 1:
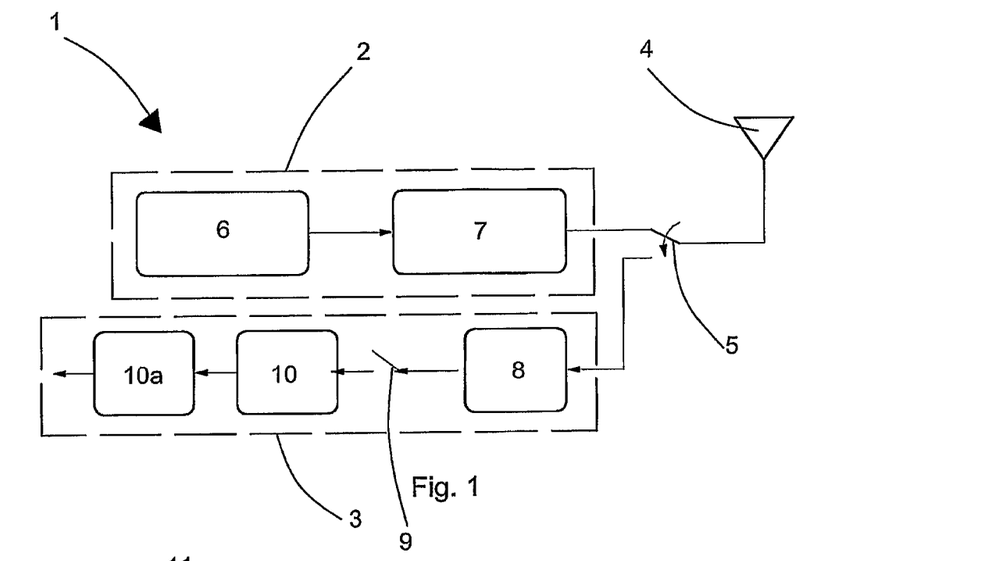
FIG. 1 shows the block diagram of a transceiver device of the present invention.

In FIG. 1 the architecture of a transceiver device 1, named reader, of the present invention is reported. The transceiver device 1 is composed of a transmitting portion 2 and a receiving portion 3, both connected, alternatively, to a first UWB antenna 4, i.e., a ultra-wide bandwidth antenna, through a switch 5. The transmitting portion 2 includes a first numerical sequence, or code, generator 6, which can be binary $c_n \in \{-1, 1\}$, or ternary $c_n \in \{-1, 0, 1\}$.

The first numerical sequence generator 6 drives a pulse generator 7 which generates a signal composed of a series of sequences of pulses with period $T_s$, each one composed of $N_s$ equally time spaced pulses with time interval $T_f$, so that $T_s = T_f * N_s$.

Each pulse composing the sequence of pulses has typically a duration less than one nanosecond, whereas the pulse polarity depends on the corresponding number of the numerical sequence generated by the first numerical sequence generator 6.

To make the communication between the reader 1 and identification RFID devices, named tags, associated therewith, "robust" with respect to the signal reflections in the surrounding environment, that is scarcely affected by such reflections, it is advantageously that the numerical sequence generated by first sequence generator 6 has zero mean value, or quasi-zero mean value, that is the numerical sequence is composed of the same number of positive units "+1" and negative units "−1", or it is composed of a number of positive units "+1" slightly different from the number of negative units "−1", or vice versa. For example, denoting $N^+$ the number of positive units of the sequence and $N^-$ the number of negative units, a numerical sequence suitable to make "robust" the communication between the tag and the reader could be, for, example, a sequence wherein $N^+ = N^-$, or a sequence wherein $N^+ = N^- \pm 1$.

Figure 6:
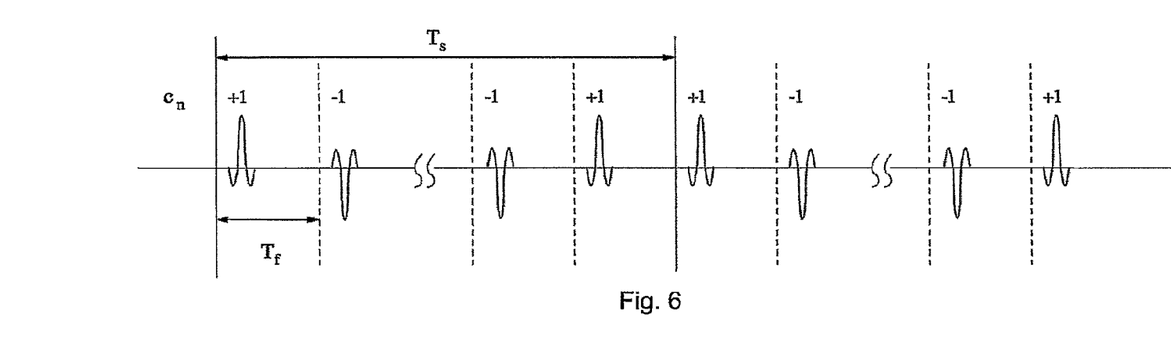
FIGS. 6 and 7 illustrate an example of signals transmitted and received by the transceiver device of FIG. 1.

In FIG. 6 there is shown an example of the structure of the signal transmitted by the reader 1, in which, in each period $T_s$ pulse sequence, the pulses with positive polarity are greater by one unit than the pulses with negative polarity, i.e. $N^+ = N^- + 1$.

The code sequence is repeated continuously during the entire tag-reader communication. To avoid intersymbol interference due to multipath, in indoor environments the time interval $T_f$ between one pulse and the successive one should be typically chosen in the order of 50-100 ns.

Figure 2:
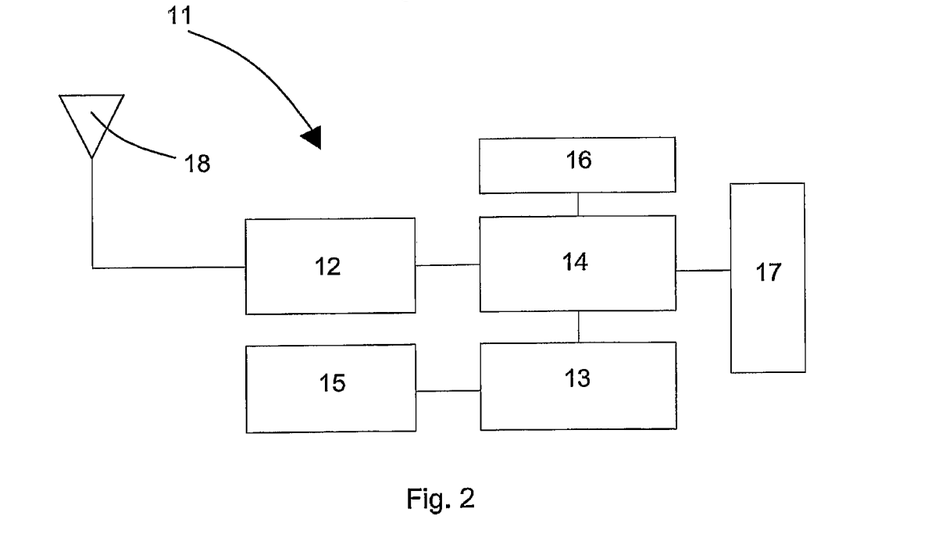
FIG. 2 shows the block diagram of a RFID device of the present invention.

The signal generated by reader 1 is received by a tag 11, whose structure is illustrated in the block diagram of FIG. 2. Tag 11 includes a backscatter modulator 12, i.e. a modulator of the signal reflected by tag 11, a second numerical sequence, or code, generator 13, similar to the first generator 6 of reader 1, the control unit 14, the synchronization unit 15 and eventually the power unit 16, a memory unit 17 and a second ultra-wide bandwidth antenna 18. The power unit 16 is present only in semi-passive tags to supply the digital section of tag 11, whereas it is not present in passive tags where the necessary energy to operate tag 11 is obtained directly from the electromagnetic field of the received signal or by exploiting other sources (solar, thermal, vibration, etc.).

Figure 3:
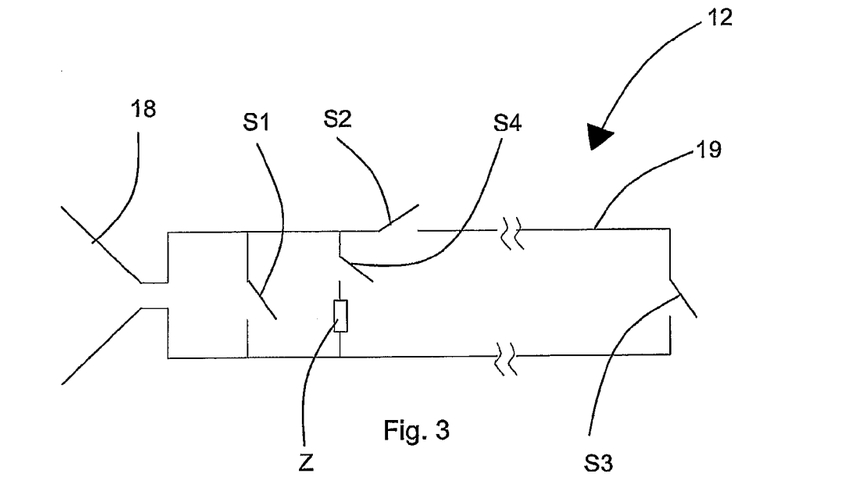
FIG. 3 shows the electrical diagram of the RFID device of FIG. 2.

In FIG. 3 the electrical diagram of the backscatter modulator 12 is reported, which includes a first switch S1, parallel to the antenna 18, a second switch S4, parallel to the antenna 18 and in series to the load impedance Z matched to the antenna impedance, and a delay line 19 in series to antenna 18 including a third switch S2 and a fourth switch S3. The length of the delay line 19 determines a delay time τ in the reflection of the signal received by the tag 11. To avoid the dimensions of the delay lines, it is convenient to be chosen a delay time not higher than a few nanoseconds.

The response of tag 11 to the received signal sent by the reader depends on the configuration of switches S1-S4 of the backscatter modulator 12. With the switch S1, S2 and S4 open, independently on the switch S3 position, each pulse received by tag 11 is reflected back to reader 1 without polarity change and delay. When switch S1 is closed and switch S4 is open, independently of the state of switches S2 and S3, each pulse received by tag 11 is reflected back to reader 1 with polarity inversion and without delay.

With switch S2 close and the other switches open, each pulse received by tag 11 is reflected back to reader 1 without polarity inversion but with a delay equal to 2τ.

When switches S1 and S4 are open and switches S2 and S3 are closed, each pulse received by tag 11 is reflected back to reader 1 with polarity inversion and delay 2τ.

Finally, with switch S4 close and switches S1 and S2 open, independently on position of switch S3, no received signal is reflected back by the tag.

Figure 5:
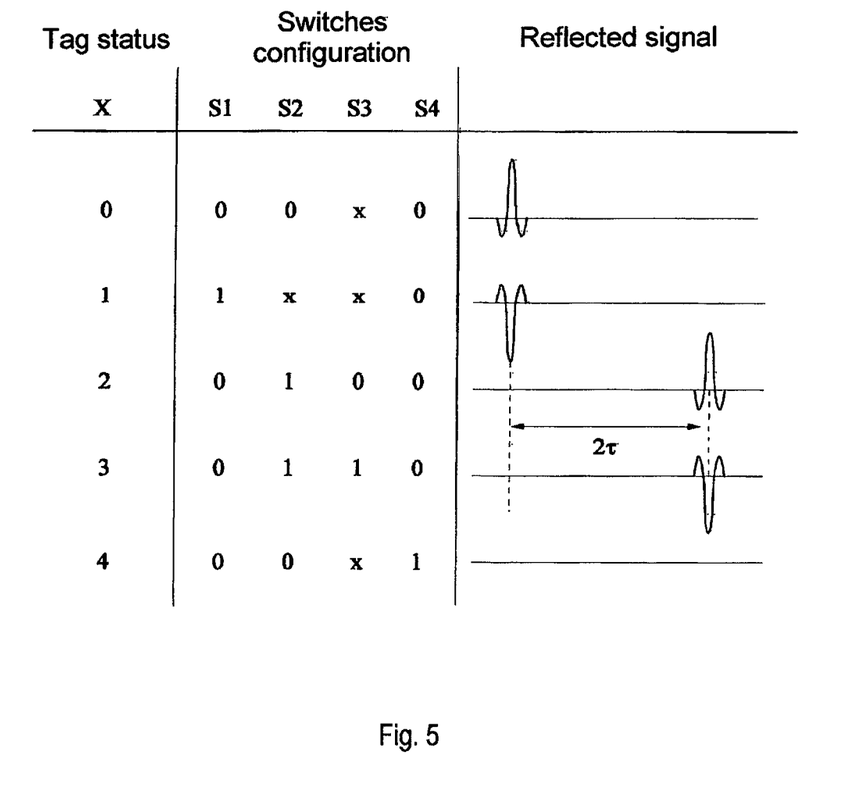
FIG. 5 shows a table which illustrates the operating mode of the RFID device.

In FIG. 5 a table summarizing the different signal reflection configurations from tag 11 previously described is shown. The first column reports the status X, labeled from 0 to 4 of tag 11, the central column reports the configuration of switches from S1 to S4, where symbol 0 indicates an open switch, symbol 1 indicates a closed switch, and symbol x indicates that the switch position can be open or closed indifferently. In the third column the signal reflected back by tag 11 is shown, where only the antenna mode component, that modulated by the tag, is reported, whereas the antenna structural mode component is not affected by the tag.

The status X of tag 11 is changed at each time interval $T_f$ according to the numerical sequence generated by the second numerical sequence generator 13, which is identical to the numerical sequence generated by the first numerical sequence generator 6 of reader 1. In addition, the status of tag 11 is changed at each period $T_s$ of the signal, depending on the information bit the tag intends to transmit to the reader, that is to each period $T_s$ an information bit corresponding to a positive unit, or a negative unit, is associated. The information bit sequence to be transmitted is contained in the memory unit 17 of tag 11. The control unit 14 retrieves this information bit sequence from the memory unit 17 and combines it with the numerical sequence generated by the second sequence generator 13 to determine the status of tag 11 at each time interval $T_f$ and at each period $T_s$.

Using a backscatter modulator, as that illustrated in FIG. 3, different modes of modulation of the signal reflected by tag 11 are possible:
  a so called 2-PAM type modulation (binary pulse amplitude modulation);
  a so called 2-PPM type modulation (binary pulse position modulation);
  ON-OFF type modulation.

It has to be noted that 2-PAM and ON-OFF modulations can be realized using a backscatter modulator without the delay line 19, and hence a backscatter modulator wherein only switches S1 and S4 and the load impedance Z are present.

According to this invention, the modulation of the signal reflected by tag 11 is realized by inverting, within each period $T_s$ of the sequence of pulses, the pulse polarity according to the same coding sequence of the reader so that all pulses within the same period $T_s$ have the same polarity. This polarity inversion affects only the antenna mode component of the reflected signal, whereas it does not affect the structural mode component.

Based on the modulation scheme adopted by the tag, the polarity, position or presence of pulses in each period $T_s$ depends on the information bit to be transmitted. As an example, when the specific case of a 2-PAM modulation scheme is considered, signal modulation consists of inverting the polarity of all pulses within each period $T_s$ if the information bit to be transmitted is a negative unit, whereas the polarity of all pulses within each period $T_s$ is kept unaltered if the information bit to be transmitted corresponds to a positive unit.

The signal received by the receiving portion 3 of the reader 1 is composed, in addition to the mentioned antenna mode and structural mode components of the signal reflected by tag 11, by all those components (clutter) reflected by the surrounding environment, not affected by such polarity inversions.

The receiving portion 3 of reader 1 includes a filter 8 matched to the received pulses, which function is to maximize the signal-to-noise ratio, a sampling device 9, an accumulation unit 10 and a threshold detector 10a. The accumulation unit 10 sums all received signal portions of duration $T_f$ within a period $T_s$. Owing to the polarity inversions generated by tag 11, pulses composing the antenna mode component of the reflected signal are summed together resulting in a signal having intensity Ns times larger than the intensity of the antenna mode component of a single pulse, while the structural mode and clutter components, even if dominant in each single pulse, are eliminated or drastically reduced owing to the zero mean or quasi-zero mean property of the code numerical sequence utilized.

In this way, the detector 10a is able to detect easily, with low probability of error, the coded signal reflected by tag 11, i.e. the antenna mode component of the signal, owing to the drastic reduction of the effects of the structural mode and clutter components in the received signal.

Figure 7:
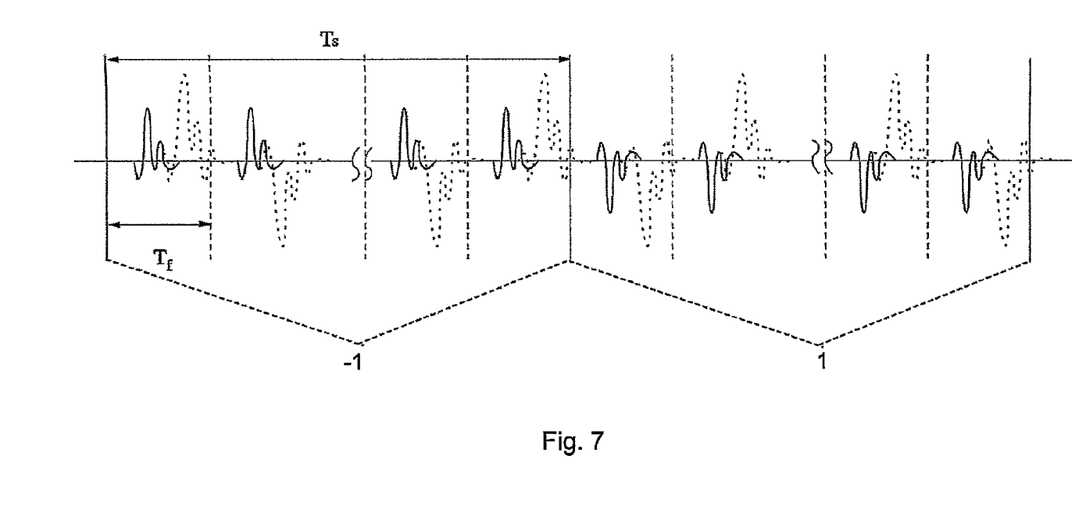

In FIGS. 6 and 7, an example of signal structure emitted by reader 1 and reflected by tag 11, as received by reader 1, are shown, respectively, where the antenna mode components are plotted with a continuous line, while the structural mode and clutter components are plotted with dashed lines. As can be noted, in each sequence of pulses in a period $T_s$ of the signal received by reader 1 all antenna mode components have the same polarity, while the structural mode and clutter components have alternatively opposite polarity, in such a way the antenna mode components are summed by the detector 10a while the structural mode and clutter components give zero or quasi-zero sum.

Figure 4:
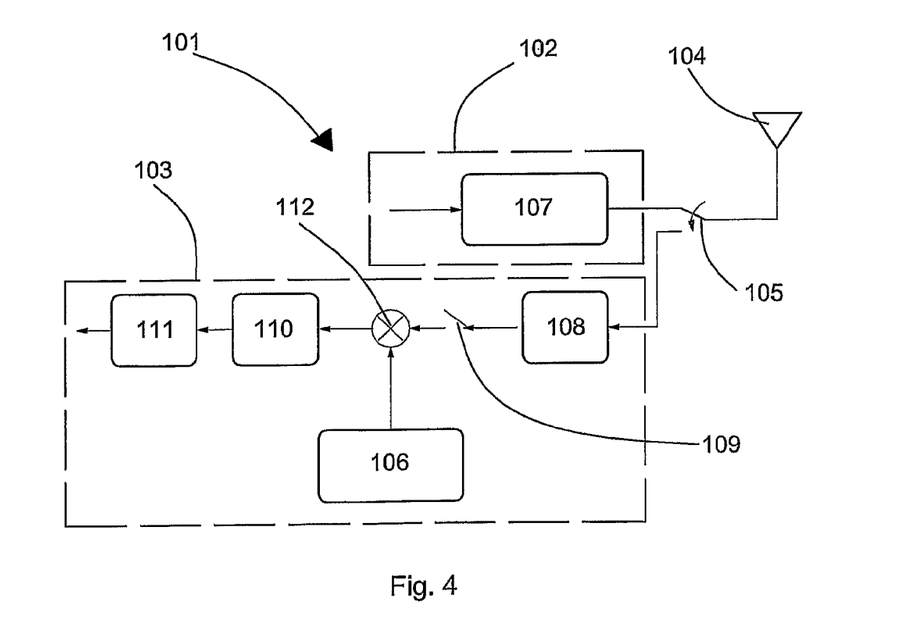
FIG. 4 shows the block diagram of a variation of the transceiver device of FIG. 1.

In FIG. 4 an alternative block diagram of a reader 101 including a transmitting portion 102, composed of only a Pulse generator 107, and a receiving portion 103 composed of a filter 108 matched to the received pulses, which function is to maximize the signal-to-noise ratio, a sampling device 109, a first numerical binary $c_n \in \{-1,1\}$, or ternary $c_n \in \{-1,0,1\}$ sequence generator 106, a multiplier 112 which multiplies the signal received by the reader by such a numerical sequence, an accumulation unit 110 and a threshold detector 111.

In addition, the reader 101 comprises a switch 105 to connect alternatively the transmitting portion 102 and the receiving portion 103 to a ultra-wide bandwidth antenna 104.

The functionality of reader 101 is equivalent to the functionality of reader 1 described previously. The first code sequence generator 106 is located in the receiving portion 103, instead of in the transmitting portion, whereas pulse generator 107 of the transmitting portion 102 is configured to send a sequence of pulses having the same polarity. The functionality of the tag remains unchanged. According to this scheme, the interfering components of the signal due to the structural mode and clutter are received without polarity inversions while the useful component of the signal, that of antenna mode, carrying the information, is affected in tag 11 by polarity inversions according to the code sequence $c_n$. Such polarity inversions of the pulses reflected by tag 11 are compensated, in the receiving portion of the reader, through the multiplication, using the multiplier 112, of received signal samples by the code sequence $c_n$ generated by the first numerical sequence generator 106, which is equal to the code sequence adopted by tag 11. After the multiplication the final result is the same as that obtained using the reader 1 version illustrated in the scheme in FIG. 1.

Figure 8:
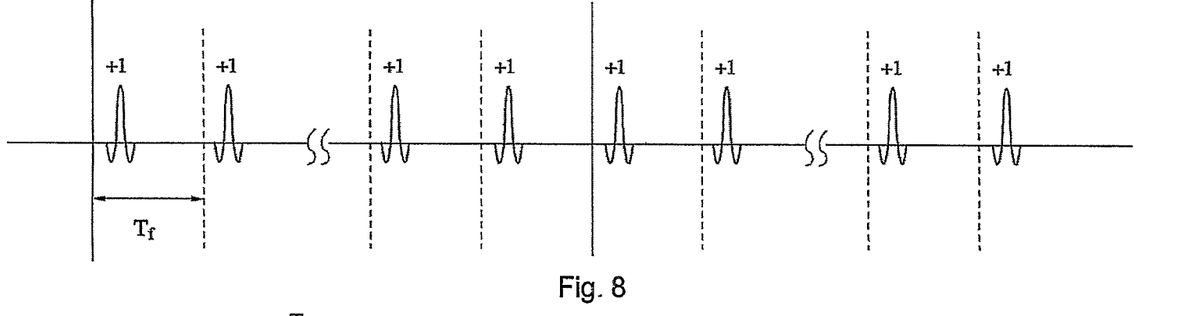
FIGS. 8 and 9 illustrate an example of signals transmitted and received by the transceiver device of FIG. 4.
Figure 9:
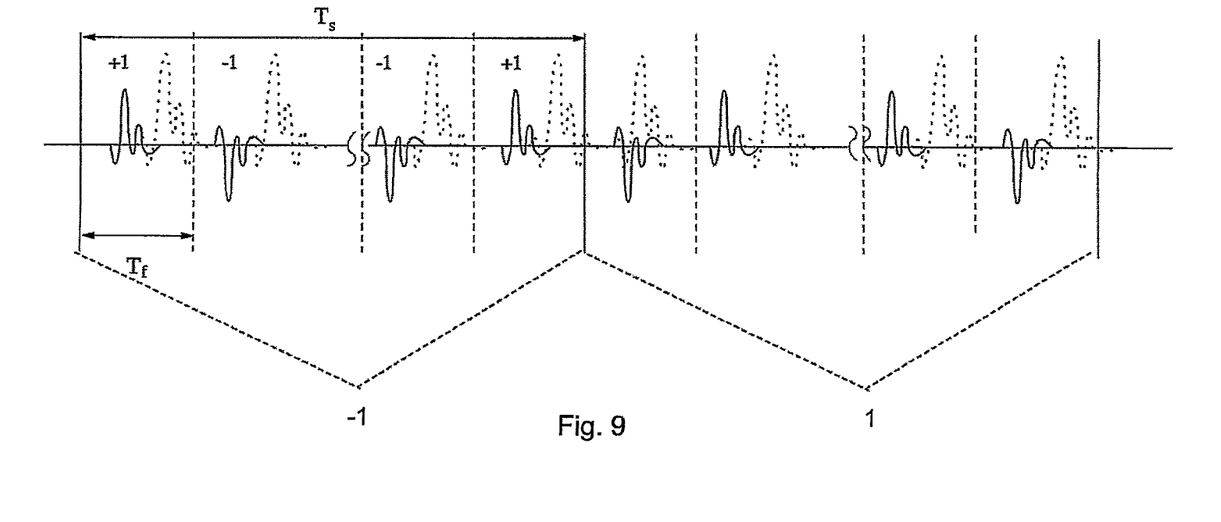

In FIGS. 8 and 9, an example of signal structure emitted by reader 101 and reflected by tag 11, as received by reader 101, are shown, respectively, where the antenna mode components are plotted with a continuous line, while the structural mode and clutter components are plotted with dashed lines.

As can be noted, in each sequence of pulses in a period $T_3$ of the signal received by reader 101 all antenna mode components have alternatively opposite polarities, while the structural mode and clutter components have the same polarity, in such a way that, after the multiplication, through the multiplier 112, of received signal samples by the code sequence $c_n$ generated by the first numerical sequence generator 106, all antenna mode components within each period $T_s$ have the same polarity and are summed together by detector 111, while the structural mode and clutter components have alternatively opposite polarity giving zero or quasi-zero sum.

The present invention allows several advantages in tag-reader communication in a RFID system, such as high capability of the signal to penetrate through obstacles, low transmitted mean power, high immunity to interference caused by signal reflections in the surrounding environment and by the presence of signals of other RFID systems; high transmission security because the signal can be decoded only if one knows the exact numerical sequence used in the reader and in the tag; high spatial and temporal resolution, possibility to manage at the same time a large number of tags, for example, by assigning different numerical sequences to different tags; possibility of coexistence of several RFID systems in the same area by assigning different numerical sequences to the different systems.

The invention claimed is:

1. A method for the communication in ultra-wide bandwidth RFID systems, comprising the steps of generating through a transceiver device an interrogation ultra-wide bandwidth signal, said interrogation signal comprising a series of sequences of pulses with a period, each sequence of pulses being composed of a plurality of equally time spaced pulses, transmitting said interrogation signal to at least one RFID identification device, processing said interrogation signal according to the information stored in said RFID device and transmitting it back to the transceiver device as a response signal, receiving said response signal through said transceiver device and further processing said response signal to detect said information included in said response signal, wherein the method further comprises the steps of coding said interrogation signal during said generating in said transceiver device according to a numerical coding sequence that determines the polarity of each pulse of each sequence of pulses;

generating, in said RFID identification device, said response signal by varying, in each sequence of pulses of said series of sequence of pulses of the interrogation signal, the polarity of the pulses using said numerical coding sequence, so that all reflected pulses in a same sequence of pulses have the same polarity, the polarity of the pulses in a same sequence of pulses depending on the information bit to be transmitted; and summing together the pulses in each sequence of the response signal.

2. A method for the communication in ultra-wide bandwidth RFID systems, comprising the steps of generating through a transceiver device an interrogation ultra-wide bandwidth signal, said interrogation signal comprising a series of sequences of pulses with a period, each sequence of pulses being composed of a plurality of equally time spaced pulses, transmitting said interrogation signal to at least one RFID identification device, processing said interrogation signal according to the information stored in said RFID device and transmitting it back to the transceiver device as a response signal, receiving said response signal through said transceiver device and further processing said signal to detect said information included in said response signal, wherein the method further comprises the steps of generating said sequence of pulses so that all pulses of a same sequence of pulses have the same polarity;

generating, in said RFID identification device, said response signal by coding said interrogation signal according to a numerical coding sequence and to the information stored in said RFID device that determines the polarity of each pulse of each sequence of pulses;

decoding, in said transceiver device, said response signal by modifying, in each sequence of pulses of said series of sequences of pulses of the response signal, the polarity of pulses using said numerical coding sequence, so that all pulses in a same sequence of pulses have the same polarity; and summing together the pulses in each sequence of pulses of the response signal after said decoding.

3. The method according to claim 1, wherein said numerical sequence is a binary $c_n \in \{-1,1\}$, or ternary $c_n \in \{-1,0,1\}$ numerical sequence.

4. The method according to claim 3, wherein said numerical sequence is a zero or quasi-zero sum numerical sequence.

5. The method according to claim 4, wherein in each period of said numerical sequence the number of positive units is equal to the number of negative units.

6. The method according to claim 4, wherein in each period of said numerical sequence the number of positive units differs from the number of negative units in one unit.

7. The method according to claim 1, wherein the duration of each pulse in each sequence of pulses is less than one nanosecond.

8. The method according to claim 1, wherein a time interval between two successive pulses in each sequence of pulses is not less than 50 nanoseconds.

9. The method according to claim 1, wherein the time interval between two successive pulses in each sequence of pulses is greater than 100 nanoseconds.

10. An apparatus for the communication in ultra-wide bandwidth RFID systems, comprising a transceiver device and a RFID identification device suitable for communicating with each other, wherein said transceiver device comprises a transmitting portion and a receiving portion, said transmitting portion comprising a first numerical sequence generator for generating an interrogation signal comprising a series of sequences of pulses with a period, each sequence of pulses being composed of a plurality of equally time spaced pulses, and wherein said RFID identification device comprises a backscatter modulator suitable for modulating a signal generated by said transceiver device and reflected back by an antenna of the RFID identification device, said backscatter modulator comprising a first switch placed in parallel with the antenna and a second switch, in parallel with the antenna and in series with a load impedance, said backscatter modulator further comprising a delay line placed in series with the antenna and comprising a third switch and a fourth switch, both said third switch and said fourth switch being placed in series with the antenna.

11. The apparatus according to claim 10, wherein said first numerical sequence generator is operationally associated with a pulse generator.

12. The apparatus according to claim 10, wherein said first numerical sequence generator is associated with a multiplier device suitable for multiplying the signal received by said receiving portion by said numerical sequence.

13. The apparatus according to claim 11, wherein said first numerical sequence generator generates a binary $c_n \in \{-1,1\}$, or ternary $c_n \in \{-1,0,1\}$ numerical sequence.

14. The apparatus according to claim 11, wherein said receiving portion comprises a matched filter, a sampler device, an accumulation unit, a threshold detector, an antenna and a switch to alternatively connect said antenna to said transmitting portion and said receiving portion.

15. The apparatus according to claim 10, wherein said RFID identification device comprises a second numerical sequence generator, a control unit, a synchronization unit, and a memory unit.

16. The apparatus according to claim 15, wherein said second numerical sequence generator generates a numerical sequence identical to the numerical sequence generated by said first numerical sequence generator.

17. The apparatus according to claim 15, wherein said RFID identification device further comprises a power unit.

18. The method according to claim 2, wherein said numerical sequence is a binary $c_n \in \{-1,1\}$, or ternary $c_n \in \{-1,0,1\}$ numerical sequence.

19. The method according to claim 2, wherein the duration of each pulse in said sequence of pulses is less than one nanosecond.

20. The method according to claim 2, wherein a time interval between two successive pulses of said sequence of pulses is not less than 50 nanoseconds.

21. The method according to claim 2, wherein a time interval between two successive pulses of said sequence of pulses is greater than 100 nanoseconds.

22. The apparatus according to claim 12, wherein said first numerical sequence generator generates a binary $c_n \in \{-1,1\}$, or ternary $c_n \in \{-1,0,1\}$ numerical sequence.

* * * * *